United States Patent [19]

Sakamoto et al.

[11] Patent Number: 4,784,009
[45] Date of Patent: Nov. 15, 1988

[54] GEAR TYPE TRANSMISSION APPARATUS

[75] Inventors: Kenji Sakamoto; Etsuo Shirai; Kazuhiko Moriyama; Hiroaki Nagamatsu, all of Hiroshima, Japan

[73] Assignee: Mazda Motor Corporation, Hiroshima, Japan

[21] Appl. No.: 76,398

[22] Filed: Jul. 22, 1987

[30] Foreign Application Priority Data

Jul. 23, 1986 [JP] Japan ................. 61-173280
Aug. 4, 1986 [JP] Japan ................. 61-183647

[51] Int. Cl.⁴ .......................................... G05G 9/12
[52] U.S. Cl. ............................... 74/475; 74/473 R; 74/477; 74/606 R
[58] Field of Search .............. 74/473 R, 475, 477, 74/606 R

[56] References Cited

U.S. PATENT DOCUMENTS

| | | | |
|---|---|---|---|
| 3,367,205 | 2/1968 | Ratliff | 74/477 |
| 3,581,594 | 6/1971 | Longshore | 74/475 |
| 4,539,865 | 9/1985 | Yoneda et al. | 74/606 R |
| 4,543,845 | 10/1985 | Sabel | 74/477 |
| 4,653,342 | 3/1987 | Ota et al. | 74/473 R |

FOREIGN PATENT DOCUMENTS 55-40416 3/1980 Japan.
56-62458 5/1981 Japan.

Primary Examiner—Allan D. Herrmann
Attorney, Agent, or Firm—Gerald J. Ferguson, Jr.

[57] ABSTRACT

A gear type transmission apparatus comprises a transmission case containing a plurality of gear trains and an output shaft to which an output of an engine is transmitted through the gear trains and provided with an opening at an upper portion thereof, a cover member mounted on the upper portion of the transmission case to cover the opening, a holder member formed separately from the cover member and fixed on an under surface of the cover member to be positioned at the inside of a contacting face of the cover member provided for coming into contact with an upper end face of the transmission case, and a shift rod supported by the holder member to be movable in a direction along its axis at a position above the output shaft for causing the gear trains to be in operation to transmit the output of the engine selectively.

11 Claims, 5 Drawing Sheets

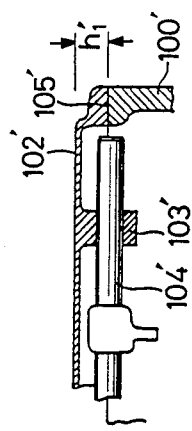
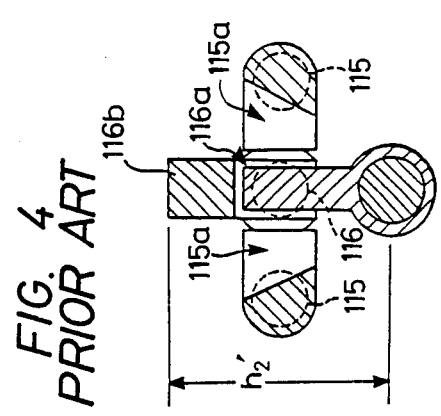
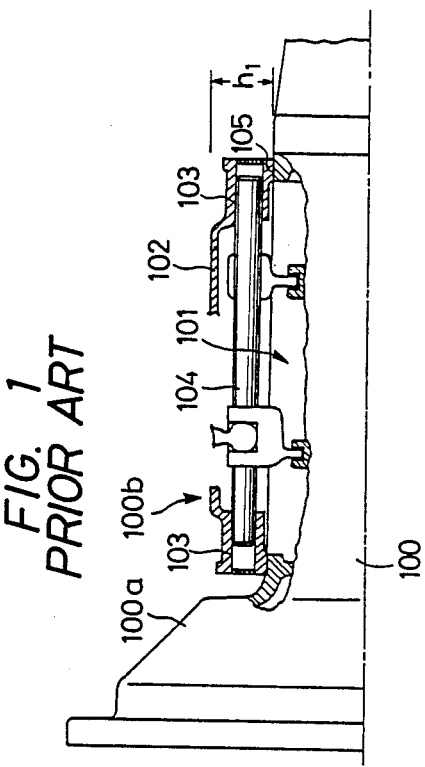
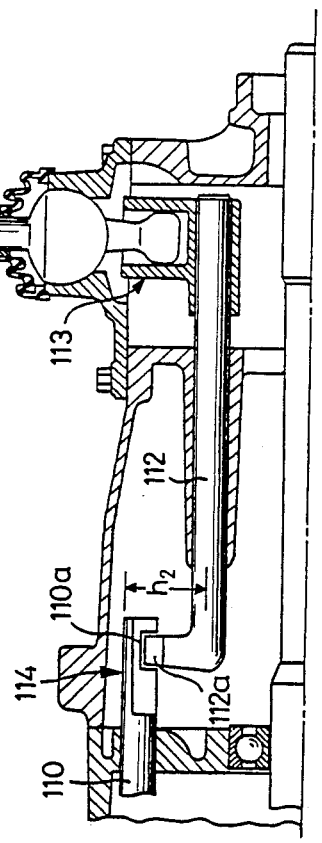
FIG. 1 PRIOR ART
FIG. 2 PRIOR ART
FIG. 3 PRIOR ART
FIG. 4 PRIOR ART

GEAR TYPE TRANSMISSION APPARATUS

BACKGROUND OF THE INVENTION

1. Field of the Invention

The present invention relates generally to gear type transmission apparatus for use in vehicles, and more particularly, to a gear type transmission for a vehicle in which a novel change gear control mechanism including a control rod and a shift rod is employed.

2. Description of the Prior Art

As known conventionally, in a transmission of the gear type for use in a vehicle, a plurality of gear trains each having a different gear ratio and arranged between an input shaft and an output shaft, and a plurality of shift rods selectively connected with a gear shifting lever to be made operative are provided, and one or more of the gear trains are selected, through a shift fork mechanism and a synchronising mechanism, by means of manipulation of the gear shifting lever causing one or more shifting rods to operate selectively, to be operative to transmit power from the input shaft to the output shaft. In connection with such a transmission of the gear type, there has been proposed to support the shift rods by a cover member which is provided for covering an opening formed at an upper portion of a transmission case in which the input shaft, output shaft, gear trains, shift rods and so on are contained, as disclosed, for example, in the Japanese utility model application published before examination under publication No. 56/62458.

FIG. 1 shows schematically a part of a transmission in which shift rods are provided in the manner thus proposed previously. In FIG. 1, a transmission case 100 is provided at an upper portion thereof with an opening 101 and a cover member 102 disposed on the upper portion to cover the opening 101. The cover member 102 is provided at front and rear end portions thereof with bearings 103 and a shift rod 104 is supported at both end portions thereof by the bearings 103 so as to be contained in the cover member 102. In such a case, the shift rod 104 can be easily mounted on the transmission by causing the shift rod 104 to engage with the bearings 103 to be attached to the inside of the cover member 102 and then mounting the cover member 102 which is accompanied with the shift rod 104 on the upper portion of the transmission case 100 to cover the opening 101.

However, in the event of the structural arrangement as shown in FIG. 1, since the bearings 103 are provided at the front and rear end portions of the cover member 102 for supporting the shift rod 104, the shift rod 104 is positioned above a contacting face 105 which is formed at a lower end portion of the cover member 102 for coming into contact with an upper end face of the transmission case 100 which surrounds the opening 101. Accordingly, the height ($h_1$) of the cover member 102 measured from the contacting face 105 becomes relatively large and therefore a major portion 100b of the transmission containing the gear trains and located behind a clutch housing 100a is arranged to be relatively tall. This results in a problem that a vehicle to which the transmission is applied is required to have a floor which is so raised as to restrict a cabin space formed in the vehicle.

For avoiding the problem mentioned above, it has been further proposed, as shown in FIG. 2, to support a shift rod 104' by a bearing 103' which is provided at the inside of a cover member 102' to project from the cover member 102' downward so as to be lower than a contacting face 105' formed at a lower end portion of the cover member 102' for coming into contact with an upper end face of a transmission case 100'. With such a configuration, the shift rod 104' can be positioned to be at the same level as the contacting face 105' or lower than the contacting face 105', and therefore the height ($h_1'$) of the cover member 102' measured from the contacting face 105' is reduced.

However, in the case where such a structural arrangement shown in FIG. 2 is employed, since the bearing 103' which projects from the inner surface of the cover member 102' is a hindrance to the movement of a tool for processing the contacting face 105' of the cover member 102', it is difficult to process the contacting face 105' of the cover member 102' with sufficient precision. Consequently, it is feared that undesirable minute gaps are formed between the contacting face 105' of the cover member 102' and the upper end face of the transmission case 100' and therefore a matched portion between the contacting face 105' of the cover member 102' and the upper end face of the transmission case 100' is not provided with proper sealing performance, so that oil contained in the transmission leaks out of the transmission case 100'.

Further, in the case where the gear shifting lever is provided at the rear portion of the transmission, there has been also proposed to use a control rod provided between the shift rods and the gear shifting lever for connecting therethrough each of the shift rods with the gear shifting lever, as disclosed, for example, in the Japanese utility model application published before examination under publication No. 55/40416.

FIG. 3 shows schematically a part of a transmission in which the control rod is provided in the manner proposed previously as mentioned above. In FIG. 3, a control rod 112 is provided between a plurality of shift rods 110 (one of the shift rods 110 is shown in FIG. 3) and a gear shifting lever 111. A rear end portion of the control rod 112 is coupled with a lower end portion of the gear shifting level 111 through a coupling member 113 fixed on the control rod 112, and a front end portion of the control rod 112 is connected through a gate mechanism 114 with a rear end portion of one of the shift rods 110 selectively for causing the shift rod 110 to be in operation. The gate mechanism 114 comprises a projection 112a provided at the front end portion of the control rod 112 to protrude upward and a depression 110a formed at the rear end portion of each shift rod 110. The projection 112a is moved to swing in accordance with the rotation of the control rod 112 caused through the manipulation of the gear shifting lever 111 so as to engage with the depression 110a formed on each shift rod 110 and thereby make one of the shift rods 110 become operative selectively.

In the transmission provided with the gate mechanism 114 as described above, the top of the projection 112a protruding upward from the front end portion of the control rod 112 is caused to engage with the depression 110a formed at the rear end portion of each shift rod 110 to look downward and positioned above, and therefore the height ($h_2$) of the gate mechanism 114 measured from an axis of the control rod 112 becomes considerably large. This results in the disadvantage that the transmission is inevitably shaped to be relatively tall and consequently a vehicle to which the transmission is applied is required to have a floor which is so raised as to restrict a cabin space formed in the vehicle.

In the case where a couple of shift rods are provided, the height $h_2$ of the gate mechanism 114 can be reduced by means of arranging the depression formed at the rear end portion of each shift rod to be sideways. However, in the event of three shift rods, as shown in FIG. 4, although each of depressions 115a formed on both side shift rods 115 is able to be made sideways, a depression 116a formed on a central shift rod 116 is unavoidably caused to look downward. Therefore, a portion 116b of the central shift rod 116 disposed on the depression 116a protrudes upward and, as a result, the height ($h_2'$) of the gate mechanism can not be reduced.

OBJECTS AND SUMMARY OF THE INVENTION

Accordingly, it is an object of the present invention to provide a gear type transmission apparatus which avoids the aforementioned problems and disadvantages encountered with the prior art.

Another object of the present invention is to provide a gear type transmission apparatus which has a major portion thereof containing a plurality of gear trains and arranged to have a reduced dimension in its height.

A further object of the present invention is to provide a gear type transmission apparatus which is provided with shift rods supported for causing selected gear trains to be in operation by a cover member mounted on a transmission case to cover an opening formed at an upper portion of the transmission case and arranged to have a reduced dimension in its height with the cover member having a contacting face processed with sufficient precision for coming into contact with an upper end face of the transmission case.

A still further object of the present invention is to provide a gear type transmission apparatus which is provided with a gate mechanism which is operative to couple a control rod connected to a gear shifting lever with one of shift rods selectively so as to cause selected gear trains to be in operation and arranged to have a reduced dimension in its height.

According to the present invention, there is provided a gear type transmission apparatus comprising a transmission case containing a gear train arrangement including a plurality of gear trains and an output shaft to which an output of an engine is transmitted through the gear train arrangement and provided with an opening at an upper portion thereof, a cover member mounted on the upper portion of the transmission case to cover the opening, a holder member formed separately from the cover member and fixed on an under surface of the cover member to be positioned at the inside of a contacting face of the cover member provided for coming into contact with an upper end face of the transmission case, and a shift rod supported by the holder member for causing the gear trains to be in operation to transmit the output selectively.

In an embodiment of gear type transmission apparatus according to the present invention taken by way of example, three shift rods are provided to be arranged in substantially parallel with one another and a control rod rotated around its axis and shifted in a direction along its axis is also provided for engaging with each of the shift rods selectively through a gate mechanism. The gate mechanism comprises three contacting members which are positioned at rear end portions of the shift rods respectively and provided thereto with respective cutouts made to be adjacent to one another and an engaging projection provided at a front end portion of the control rod for engaging with one of the cutouts selectively when the control rod is rotated. The connecting member positioned at the rear end portion of the central shift rod is provided with a pair of block portions arranged in a direction along the length of the central shift rod to face each other with the cutout between and a linking portion disposed to overlap with the connecting member positioned at the rear end portion of one of the side shift rods for interconnecting therethrough the block portions. The linking portion is shaped to detour around a moving area of the engaging projection which is in engagement with the cutout formed on the connecting member with which the linking member overlaps, so as not to interfere with the engaging projection.

In the gear type transmission apparatus constituted as mentioned above in accordance with the present invention, since the shift rod is supported by the holder member fixed on the under surface of the cover member to be positioned at the inside of the contacting face of the cover member, the holder member and the shift rod can be disposed to project downward beyond the level of contacting face of the cover member, so that the height of the cover member can be reduced. Before the holder member which is formed separately from the cover member is fixed on the under surface of the cover member, the cover member does not have any portion projecting from its under surface downward beyond the level of the contacting face thereof and therefore the contacting face can be processed to be flat with sufficient precision. Accordingly, a matched portion between the contacting face of the cover member and the upper end face of the transmission case can be provided with superior sealing performance.

In the embodiment, the connecting member which is positioned at the rear end portion of the central shift rod with the cutout formed therein for constituting partially the gate mechanism is provided with the linking portion which interconnects therethrough the block portions arranged to face each other with the cutout between and is disposed to overlap with the connecting member positioned at the rear end portion of one of the side shift rods so as not to protrude upward from the upper end of each of the side shift rods, and consequently the height of the gate mechanism can be reduced.

The above, and other objects, features and advantages of the present invention will become apparent from the following detailed description which is to be read in conjunction with the accompanying drawings.

BRIEF DESCRIPTION OF THE DRAWINGS

FIG. 1 is a schematic side view, partially in cross-section, of a part of a first previously proposed gear type transmission;

FIG. 2 is a schematic cross-sectional view of a part of a second previously proposed gear type transmission;

FIG. 3 is a schematic cross-sectional view of a part of a third previously proposed gear type transmission;

FIG. 4 is a schematic cross-sectional view of a part of a fourth previously proposed gear type transmission;

DESCRIPTION OF THE PREFERRED EMBODIMENT

Figure 5:
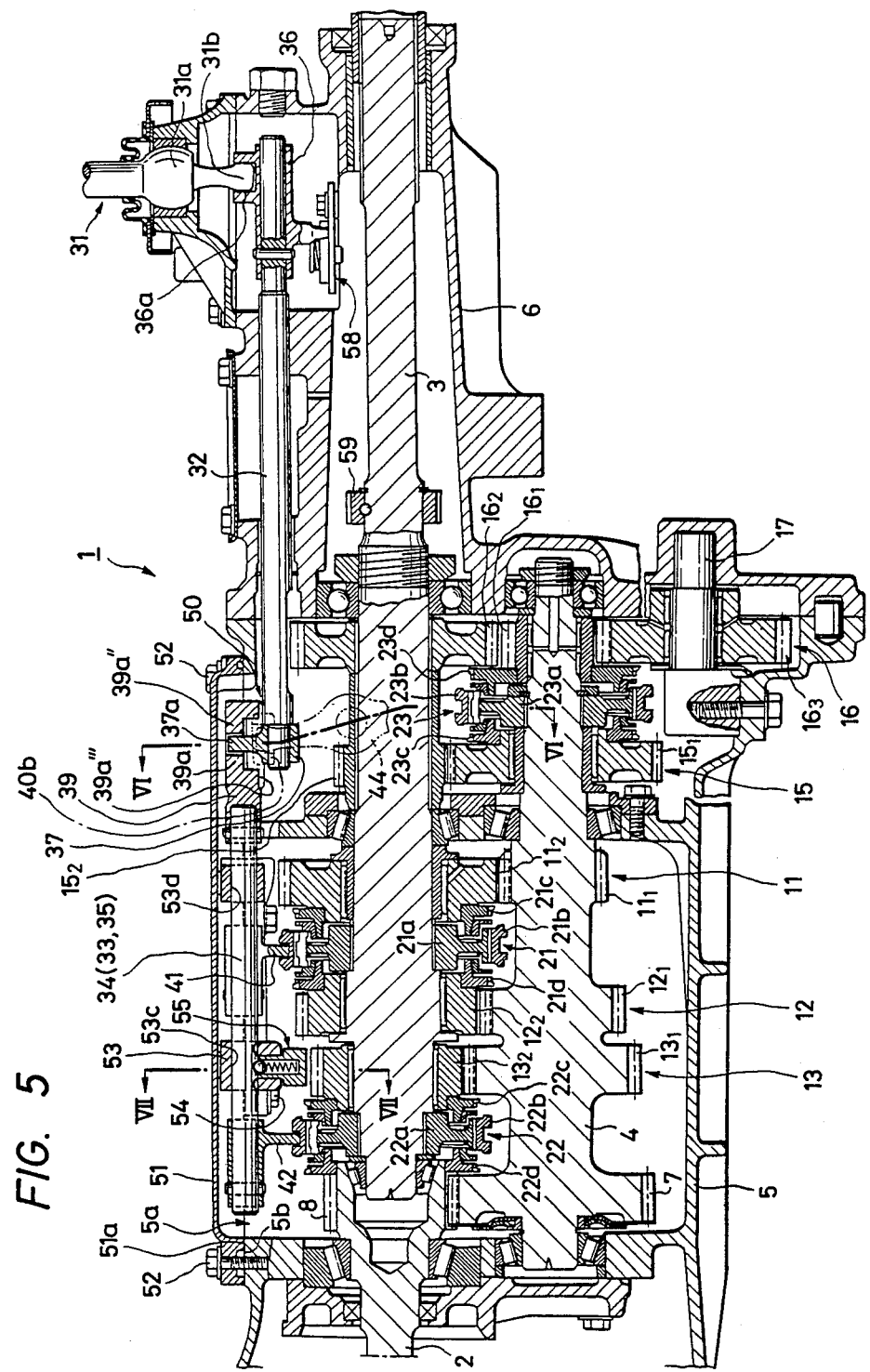
FIG. 5 is a cross-sectional view showing an embodiment of gear type transmission apparatus according to the present invention.

FIG. 5 shows an example of a gear type transmission apparatus embodying the present invention.

Referring to FIG. 5, a gear type transmission 1, which is one embodiment of gear type transmission apparatus according to the present invention, comprises an input shaft 2 coupled through a clutch device with an output shaft of an engine (not shown in FIG. 1), an output shaft 3 disposed behind and coaxially with the input shaft 2 and connected through a differential gear device to an axle to which driving wheels are attached, a counter shaft 4 disposed in parallel to and under the output shaft 3, and a gear train arrangement, each contained to be rotatable in a transmission case 5 and an extension housing 6. The input shaft 2 is provided with a driving gear 8 incorporated with a rear end portion of the input shaft 2 and the counter shaft 4 is provided with an input gear 7 incorporated with a front end portion of the counter shaft 4. The input gear 7 is caused to engage with the driving gear 8 so that the counter shaft 4 is rotated in accordance with the rotation of the input shaft 2.

A first gear train 13 provided for the third speed, second gear train 12 provided for the second speed, third gear train 11 provided for the first speed, fourth gear train 15 provided for the fifth speed (overdrive), and fifth gear train 16 provided for reversing, each contained in the gear train arrangement, are arranged successively from front to rear between the output shaft 3 and counter shaft 4. The first, second and third gear trains 13, 12 and 11 are constituted with gears $13_1$ and $13_2$ meshed with each other, gears $12_1$ and $12_2$ meshed with each other, and gears $11_1$ and $11_2$ meshed with each other, respectively. Each of the gears $13_1$, $12_1$ and $11_1$ is formed solidly on the counter shaft 4, and each of the gears $13_2$, $12_2$ and $11_2$ is mounted to be rotatable on the output shaft 3. The fourth gear train 15 is constituted with a gear $15_1$ mounted to be rotatable on the counter shaft 4 and a gear $15_2$ engaged with a spline formed on the output shaft 3 so as to be rotated by the output shaft 3 and to mesh with the gear $15_1$. Further, the fifth gear train 16 is constituted with a gear $16_1$ mounted to be rotatable on the counter shaft 4, an idle gear $16_3$ mounted to be rotatable on an idle shaft 17 and to mesh with the gear $16_1$, and a gear $16_2$ engaged with a spline formed on the output shaft 3 so as to be rotated by the output shaft 3 and to mesh with the idle gear $16_3$.

A first synchromesh 21 for the first and second speeds is provided between the gear $12_2$ and the gear $11_2$ on the output shaft 3 for causing the gears $12_2$ and $11_2$, which are mounted to be rotatable on the output shaft 3, to couple with the output shaft 3 selectively, and a second synchromesh 22 for the third and fourth speeds is provided on the front end portion of the output shaft 3 for causing the gear $13_2$, which is mounted to be rotatable on the output shaft 3, to couple with the output shaft 3 or for connecting the output shaft 3 directly to the input shaft 2. In addition, a third synchromesh 23 is provided between the gears $15_1$ and $16_1$ on the counter shaft 4 for causing the gears $15_1$ and $16_1$, which are mounted to be rotatable on the counter shaft 4, to couple with the counter shaft 4 selectively.

The first synchromesh 21 comprises a clutch hub 21a mounted on the output shaft 3 to be rotated by the same, a sleeve 21b coupled to be movable along the output shaft 3 with a spline formed on the clutch hub 21a, and clutch gears 21c and 21d for engaging with the sleeve 21b moved on the clutch hub 21a. Similarly, the second synchromesh 22 comprises a clutch hub 22a mounted on the output shaft 3 to be rotated by the same, a sleeve 22b coupled to be movable along the output shaft 3 with a spline formed on the clutch hub 22a, and clutch gears 22c and 22d for engaging with the sleeve 22b moved on the clutch hub 22a. Further, the third synchromesh 23 comprises a clutch hub 23a mounted on the counter shaft 4 to be rotated by the same, a sleeve 23b coupled to be movable along the counter shaft 4 with a spline formed on the clutch hub 23a, and clutch gears 23c and 23d for engaging with the sleeve 23b moved on the clutch hub 23a.

The gears $11_2$ and $12_2$ are coupled with the output shaft 3 by the backward and forward movements of the sleeve 21b of the first synchromesh 21, respectively. The gear $13_2$ is coupled with the output shaft 3 by the backward movement of the sleeve 22b of the second synchromesh 22 and the output shaft 3 is connected directly to the input shaft 2 by the forward movement of the sleeve 22b. Further, the gears $15_1$ and $16_1$ are coupled with the counter shaft 4 by the backward and forward movements of the sleeve 23b of the third synchromesh 23, respectively. In such a manner, the first to fifth gear trains 13, 12, 11, 15 and 16 are caused to be in power transmitting operation selectively, so that five forward speeds and one reverse speed are obtained.

Figure 6:
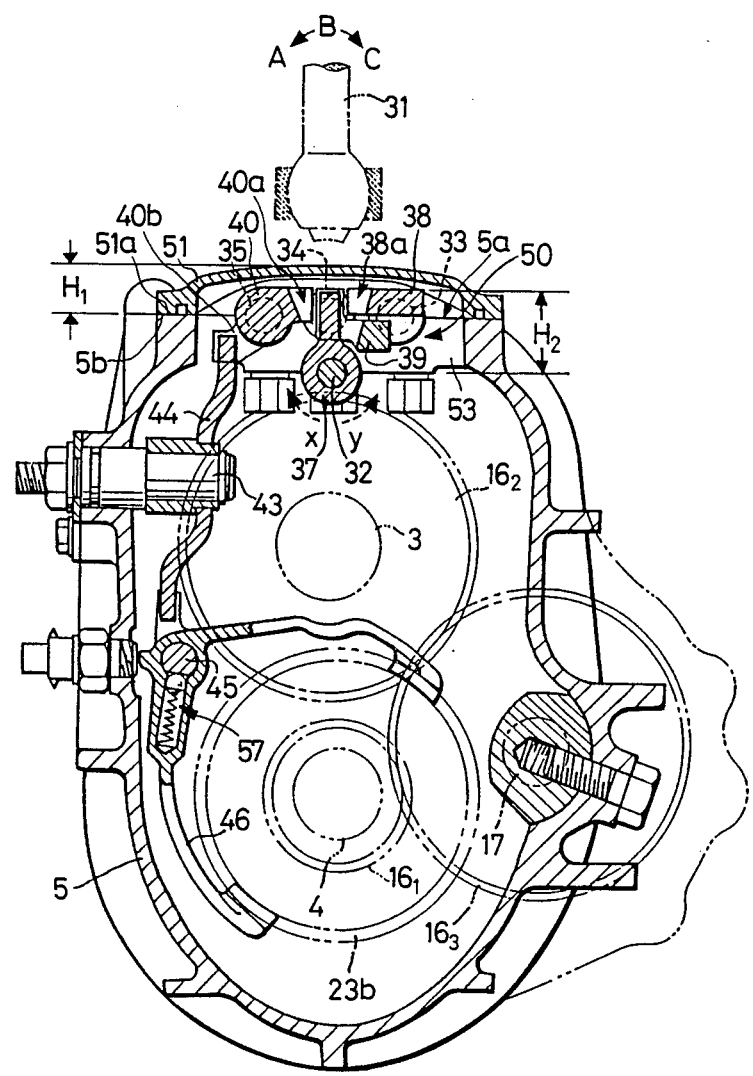
FIG. 6 is a schematic cross-sectional view of the embodiment of gear type transmission apparatus taken substantially on line VI—VI in FIG. 5.
Figure 7:
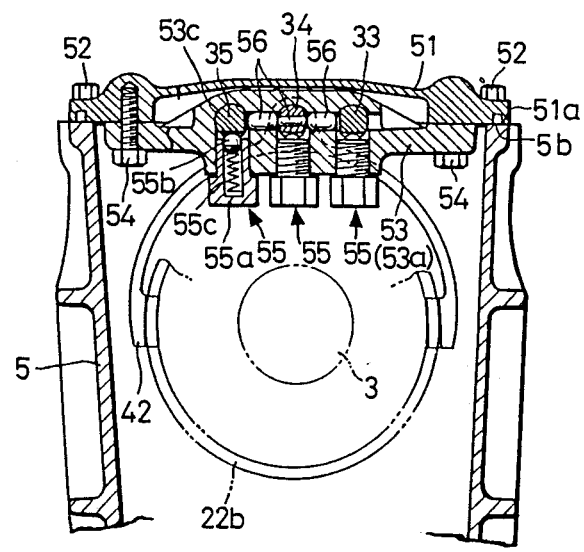
FIG. 7 is a schematic cross-sectional view of the embodiment of gear type transmission apparatus according to the present invention taken substantially on line VII—VII in FIG. 5.

In the meantime, a gear shifting lever 31 is provided to stand pivotally at the rear end portion of the extension housing 6, and a control rod 32 extending forward from a lower end portion of the gear shifting lever 31 in parallel with the output shaft 3 is provided above the output shaft 3 in the extension housing 6. Further, first, second and third shift rods 33, 34 and 35 are disposed above the output shaft 3 to be arranged in parallel with one another along the output shaft 3 in the transmission case 5, as shown in FIGS. 6, 7 and 9.

The control rod 32 is supported by bearings provided in the extension housing 6 to be lower than the first, second and third shift rods 33, 34 and 35, and provided at its rear end portion with a connecting member 36. A lower end portion 31b extending downward from a spherical bearing portion 31a of the gear shifting level 31 is engaged with a depression 36a formed on the connecting member 36, so that the control rod 32 is rotated by the lateral movements of the gear change lever 31 due to a gear selecting manipulation and shifted forward and backward by the longitudinal movement of the gear shifting lever 31 due to a gear shifting operation. As shown in FIGS. 5, 6 and 9, a gate mechanism 50 which comprises an engaging member 37 fixed on a front end portion of the control rod 32 and connecting members 38, 39 and 40 fixed on rear end portions of the first, second and third shift rods 33, 34 and 35, respectively, is disposed above the output shaft 3. In the gate mechanism 50 thus provided, the engaging member 37 is engaged with one of the connecting members 38, 39 and 40 selectively by the rotary movement of the control rod 32 and then the control rod 32 is shifted forward or backward together with one of the first, second and third shift rods 33, 34 and 35 on which the selected one of the connecting members 38, 39 and 40 is provided.

First and second shift forks 41 and 42 are fixed to the first and second shift rods 33 and 34, respectively. The first shift fork 41 engages with a peripheral portion of the sleeve 21b constituting the first synchromesh 21 and therefore the sleeve 21b is slid forward or backward on the output shaft 3 by the first shift fork 41 when the first shift rod 33 is moved forward or backward, and the second shift fork 42 engages with a peripheral portion of the sleeve 22b constituting the second synchromesh 22 and therefore the sleeve 22b is slid forward or backward on the output shaft 3 by the second shift fork 42 when the second shift rod 34 is moved forward or backward. Further, a pair of projections 40b are provided on the connecting member 40 fixed on the rear end portion of the third shift rod 35, as shown in FIGS. 6 and 9, and a reversing lever 44 is mounted to be rotatable on a pivot 43 projecting from the inner surface of the read portion of the transmission case 5, as shown in FIGS. 5 and 6, with an upper end portion thereof disposed between the projections 40b. A lower end portion of the reversing level 44 is engaged with a third shift fork 46 which is mounted to be movable forward and backward on a supporting shaft 45 and engaged with a peripheral portion of the sleeve 23b constituting the third synchromesh 23, and therefore the sleeve 23b is slid forward or backward on the counter shaft 4 by the third shift fork 46 and the reversing lever 44 which work together when the third shift rod 35 is moved forward or backward.

Figure 9:
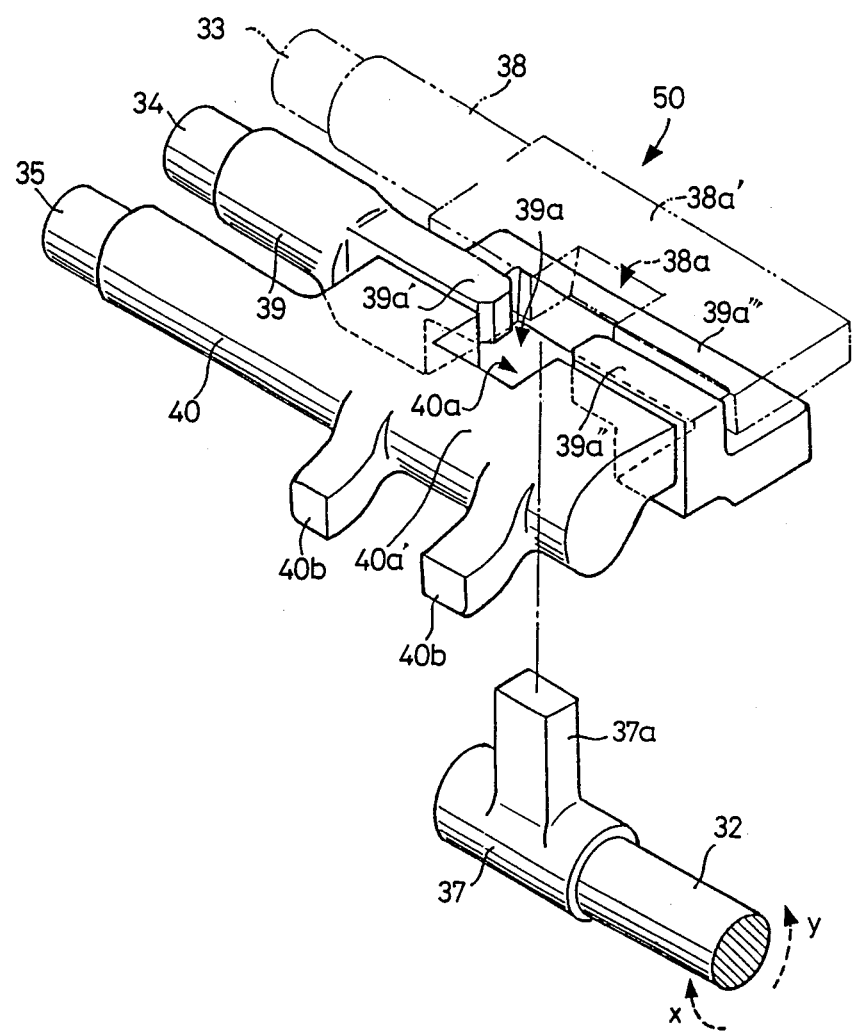
FIG. 9 is a schematic exploded perspective view showing a gate mechanism employed in the embodiment shown in FIG. 5.

As shown in FIG. 9, in the gate mechanism 50 comprising the engaging member 37 fixed on the control rod 32 and the connecting members 38, 39 and 40 fixed on the first, second and third shift rods 33, 34 and 34, an engaging projection 37a is provided to protrude upward from the engaging member 37 and to move in a vertical plane perpendicular to the control rod 32 in accordance with the rotation of the control rod 32. The connecting members 38, 39 and 40 are provided thereon respectively cutouts 38a, 39a and 40a arranged to be adjacent to each other along the vertical plane in which the engaging projection 37a moves, so that the engaging projection 37a engages with one of the cutouts 38a, 39a and 40a selectively as a result of the movement in the vertical plane.

The cutouts 38a and 40a formed on the connecting members 38 and 40 respectively are arranged to be sideways to face each other so that linking portions 38a' and 40a' contiguous to the cutouts 38a and 40a respectively are positioned at both sides of the gate mechanism 50. The cutout 39a on the connecting member 39 is formed with a pair of block portions 39a' and 39a'' arranged in a direction along the length of the second shaft rod 34 to face each other with and a linking portion 39a''' for interconnecting therethrough the block portions 39a' and 39''. The the linking portion 39a''' is disposed under the connecting member 38 to overlap with the same and formed into a ']' shape to detour around the cutout 38a formed on the connecting member 38 so as not to interfere with the engaging projection 37a which is in engagement with the cutout 38a and moves together with the connecting member 38.

Figure 8:
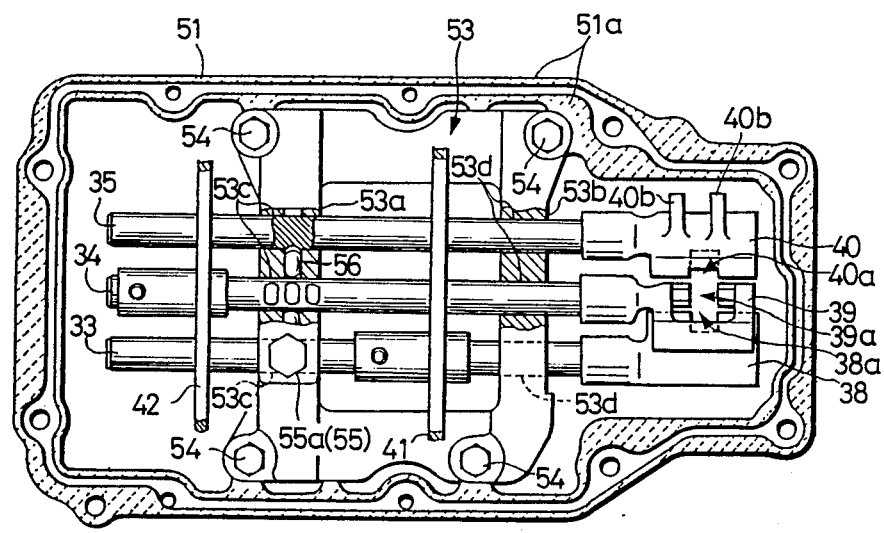
FIG. 8 is a schematic bottom view of a cover member provided with shift rods supported therein, which is used in the embodiment shown in FIG. 5.

The transmission case 5 is provided at an upper end portion thereof with an opening 5a and a cover member 51 is mounted on the upper end portion of the transmission case 5 for covering the opening 5a. The cover member 51 is fixed on the transmission case 5 with bolts 52 and a holder member 53, which is formed separately from the cover member 51 in the shape of a rectangular frame to include a front side 53a, rear side 53b and a pair of longitudinal sides interconnecting therethrough the front and rear sides 53a and 53b, is fixed on an under surface of the cover member 51 with bolts 54, as shown clearly in FIGS. 7 and 8. The under surface of the cover member 51 on which the holder member 53 is attached is in the same level as the contacting face 51a, as shown in FIG. 7.

The front side 53a of the holder member 53 is provided with three holes 53c aligned in a direction of the width of the transmission case 5 and a rear side 53b of the holder member 53 is provided with three holes 53d aligned in a direction of the width of the transmission case 5. Each of the first, second and third shift rods 33, 34 and 35 as descrived above is put to pass through a pair of corresponding holes 53c and 53d so as to be supported to be movable forward and backward by the holder member 53. The holder member 53 and the first, second and third shift rods 33, 34 and 35 supported by the holder member 53 are disposed at the inside of a contacting face 51a which is formed in the shape of a closed pass along a bottom peripheral portion of the cover member 51, as indicated by hatching of broken lines in FIG. 8, for coming into contact with an upper end face 5b of the transmission case 5 which surrounds the opening 5a, and further, lower portions of the holder member 53 and the first, second and third shift rods 33, 34 and 35 are positioned in the transmission case 5 to be lower than the upper end face 5b of the transmission case 5.

The front side 53a of the holder member 53, which is positioned above the gear $13_2$ provided on the output shaft 3 with a relatively small diameter, is provided under each of the holes 53c with a positioning device 55 having a retainer 55a in which a locking ball 55b operative to engage with and disengage from a groove formed on each of the first, second and third shift rods 33, 34 and 35, and a spring 55c for pushing up the locking ball 55b are contained, and each of the first, second and third shift rods 33, 34 and 35 is caused to stay at neutral, front and rear positions by the positioning device 55, as shown in FIG. 7. Further, the front side 53a of the holder member 53 is also provided with interlocking pins 56 which are aligned between the first and second shift rods 33 and 34 and between the second and third shift rods 34 and 35 for preventing the first, second· and third shift rods 33, 34 and 35 from being put in such a situation that two of the first, second and third shift rods 33, 34 and 35 move simultaneously to the front or rear positions from the respective neutral positions.

As shown in FIG. 6, the third shift fork 46 is also provided with a positioning device 57 for causing the third shift fork 46 to stay at neutral, front and rear positions on the supporting shaft 45 selectively.

In the event of the embodiment, a misoperation preventive portion 58 is provided for affecting the connecting member 36 to preventing the gear shifting lever 31 from being shifted to a position for the reverse speed directly from a position for the fifth speed. Further, a pinion 59 is mounted on the output shaft 3 for driving a speed meter (not shown in the drawings) in accordance with the rotation of the output shaft 3.

Now, the operation of the embodiment shown in FIG. 1 will be described.

First, when the gear shifting lever 31 is moved to a shift position A as indicated in FIG. 6, the control rod 32 to which the the connecting member 36 is fixed for engaging with the lower end portion 31b of the gear shifting lever 31 is rotated in a direction x as indicated in FIG. 9, so that the engaging projection 37a on the engaging member 37 which is fixed on the front end portion of the control rod 32 comes to engagement with the cutout 38a on the connecting member 38 which is fixed on the rear end portion of the first shift rod 33. Then, if the gear shifting lever 31 is shifted forward, the control rod 32, the first shift rod 33, the first shift fork 41 fixed to the first shift rod 33, and the sleeve 21b of the first synchromesh 21 inclusive are slid backward, and therefore the gear $11_2$ constituting the third gear train 11 and disposed behind the first synchromesh 21 comes to couple with the output shaft 3 so that the first speed is provided. To the contrary, if the gear shifting lever 31 moved to the shift position A is shifted backward, the control rod 32, the first shift rod 33, the first shift fork 41, the first shift rod 33 and the sleeve 21b inclusive are slid forward, and therefore the gear $12_2$ constituting the second gear train 12 and disposed in front of the first synchromesh 21 comes to couple with the output shaft 3 so that the second speed is provided.

Similarly, when the gear shifting lever 31 is at a shift position B as indicated in FIG. 6, the engaging projection 37a on the engaging member 37 which is fixed on the front end portion of the control rod 32 comes to engagement with the cutout 39a on the connecting member 39 which is fixed on the rear end portion of the second shift rod 34. Then, if the gear shifting lever 31 is shifted forward, the control rod 32, the second shift rod 34, the second shift fork 42, and the sleeve 22b of the second synchromesh 22 inclusive are slid backward, and therefore the gear $13_2$ constituting the first gear train 13 comes to couple with the output shaft 3 so that the third speed is provided. To the contrary, when the gear shifting lever 31 located at the shift position B is shifted backward, the control rod 32, the second shift rod 34, the second shift fork 42 and the sleeve 22b inclusive are slid forward, and therefore the output shaft 3 is connected directly to the input shaft 2 so that the fourth speed is provided.

Further, when the gear shifting lever 31 is moved to a shift position C as indicated in FIG. 6, the control rod 32 is rotated in a direction y as indicated in FIG. 9, so that the engaging projection 37a on the engaging member 37 comes to engagement with the cutout 40a on the connecting member 40 which is fixed on the rear end portion of the third shift rod 35. Then, if the gear shifting lever 31 is shifted forward, the control rod 32 and the third shift rod 35 are slid backward and the reversing lever 44 with it supper end portion engaged with the connecting member 40 which is fixed on the third shift rod 35 is rotated clockwise in FIG. 5, so that the third shift fork 46 engaging with the lower end portion of the reversing lever 44 and the sleeve 23b of the third synchromesh 23 are slid forward, and therefore the gear $15_1$ constituting the fourth gear train 15 comes to couple with the counter shaft 4 so that the fifth speed is provided. To the contrary, if the gear shifting lever 31 moved to the shift position C is shifted backward, the control rod 32 and the third shift rod 35 are slid forward and the reversing lever 44 is rotated counterclockwise in FIG. 5, so that the third shift fork 46 and the sleeve 23b are slid backward, and therefore the gear $16_1$ constituting the fifth gear train 16 comes to couple with the counter shaft 4 so that the reverse speed is provided.

In the gear type transmission 1 thus constituted in accordance with the present invention, the first, second and third shift rods 33, 34 and 35 are supported by the holder member 53 which is attached to the under surface of the cover member 51 provided for covering the opening 5a formed on the transmission case 5, and combined with a gear train arrangement including the first to fifth gear trains contained in the transmission case 5 when the cover member 51 is mounted on the transmission case 5. Under the cover member 51 mounted on the transmission case 5, the holder member 53 and the first, second and third shift rods 33, 34 and 35 are disposed to project downward beyond the level of the upper end face 5b of the transmission case 5, so that each of the first, second and third shift rods 33, 34 and 35 is placed at a relatively low position above the gear train arrangement in the transmission case 5. Consequently, the height ($H_1$) of the cover member 51 measured from the contacting face 51a thereof is effectively reduced.

The holder member 53 is formed separately from the cover member 51 to be attached to the under surface of the latter. Accordingly, before the holder member 53 is attached to the under surface of the cover member 51, the cover member 51 does not have any portion protruding from its under surface downward beyond the level of the contacting face 51a thereof and therefore the contacting face 51a can be processed to be flat with sufficient precision. As a result, a matched portion between the contacting face 51a of the cover member 51 and the upper end face 5b of the transmission case 5 can be provided with superior sealing performance.

Further, in the gate mechanism 50 employed in the gear type transmission 1 for connecting the control rod 32 with one of the first, second and third shift rods 33, 34 and 35 selectively, the cutouts 38a and 40a formed on the connecting members 38 and 40 which are disposed at both side portions of the gate mechanism 50 are arranged to be sideways to face each other and the cutout 39a on the connecting member 39 which is disposed between the connecting members 38 and 40 is formed with the block portions 39a' and 39a'' arranged in the direction along the length of the connecting member 39 and the linking portion 39a''' which interconnects therethrough the block portions 39a' and 39a'' and is disposed under the connecting member 38 to overlap the same. Consequently, the height ($H_2$) of the gate mechanism 50 is effectively reduced, so that the height of the gear type transmission 1 is also reduced. In addition, the linking portion 39a''' is shaped to detour around the cutout 38a formed on the connecting member 38 and therefore the engaging projection 37a on the engaging member 37 is not obstructed by the linking portion 39a''' from engaging with the cutout 38a and moving together with the connecting member 38.

Although the linking portion 39a''' is disposed under the connecting member 38 in the embodiment mentioned above, it is to be understood that the linking portion 39a''' may be disposed on the connecting member 38 to overlap with the same or disposed under or on the connecting member 40 to overlap the same. Besides, in the case where three shift rods are disposed to be stacked vertically, a linking portion of the shift rod lying at the middle is overlapped with both side portions of the shift rods positioned at the top and bottom, respectively.

What is claimed is:

1. A gear type transmission apparatus comprising,
a transmission case containing a gear train arrangement including a plurality of gear trains and an output shaft to which an output of an engine is transmitted through the gear train arrangement and provided with an opening at an upper portion thereof,
a cover member mounted on the upper portion of said transmission case to cover said opening,
a holder member formed separately from said cover member and fixed on an under surface of said cover member to be positioned at the inside of a contacting face of said cover member provided for coming into contact with an upper end face of said transmission case, wherein said holder member is provided with a shift rod supporting portion disposed to be at least partially lower than the level of the contacting face of said cover member, and
a shift rod supported by said shift rod supporting portion of said holder member to be movable in a direction along its axis at a position above the output shaft for causing the gear trains to be in operation to transmit the output selectively, and at least a part of one of said holder member and said shift rod is positioned to be higher than the lever of said contacting face.

2. A gear type transmission apparatus comprising,
a transmission case containing a gear train arrangement including a plurality of gear trains and an output shaft to which an output of an engine is transmitted through the gear train arrangement and provided with an opening at an upper portion thereof,
a cover member mounted on the upper portion of said transmission case to cover said opening,
a holder member formed separately from said cover member and fixed on an under surface of said cover member to be positioned at the inside of a contacting face of said cover member provided for coming into contact with an upper end face of said transmission case, and wherein said holder member is provided with a shift rod supporting portion disposed to be at least partially lower than the level of the contacting face of said cover member, and
a shift rod supported by said shift rod supporting portion of said holder member to be movable in a direction along its axis at a position above the output shaft for causing the gear trains to be in operation to transmit the output selectively.
said holder member is formed in the shape of a generally rectangular frame to include a pair of lateral side portions each extending in a direction crossing said shift rod for supporting said shift rod and a pair of longitudinal side portions each interconnecting therethrough said front and rear said portions.

3. A gear type transmission apparatus according to claim 2, wherein one of the lateral side portions of said holder member is disposed above one of gears constituting the gear trains which has a relatively small diameter and provided at the lower side with a positioning device having a retainer in which a locking member operative to engage with and disengage from a groove formed on said shift rod and a resilient member for pushing said locking member are contained.

4. A gear type transmission apparatus according to claim 2 further comprising an extension housing disposed behind said transmission case for containing a part of the output shaft and a control rod supported by said extension housing to be lower than said shift rod for engaging selectively with said shift rod.

5. A gear type transmission apparatus according to claim 2 further comprises first, second and third shift forks each engaging with a corresponding one of the gear trains, said first, second and third shift forks being disposed in front of, between and behind said lateral side portions of the holder member, respectively.

6. A gear type transmission apparatus comprising,
a transmission case containing a gear train arrangement including a plurality of gear trains and an output shaft to which an output of an engine is transmitted through the gear train arrangement and provided with an opening at an upper potion thereof,
a cover member mounted on the upper portion of said transmission case to cover said opening,
a holder member formed separately from said cover member and fixed on an under surface of said cover member to be positioned at the inside of a contacting face of said cover member provided for coming into contact with an upper end face of said transmission case,
a shift rod supported by said holder member to be movable in a direction along its axis at a position above the output shaft for causing the gear trains to be in operation to transmit the output selectively, and
wherein said contacting face of the cover member is formed along a bottom peripheral portion of the cover member and at least a part of said shift rod is positioned to be higher than the lever of said contacting face.

7. A gear type transmission apparatus according to claim 6 further comprising an extension housing disposed behind said transmission case for containing a part of output shaft and a control rod supported by said extension housing to be lower than said shift rod for engaging selectively with said shift rod.

8. A gear type transmission apparatus comprising,
a transmission case containing a gear train arrangement including a plurality of gear trains and an output shaft to which an output of an engine is transmitted through the gear train arrangement and provided with an opening at an upper portion thereof,
a cover member mounted on the upper portion of said transmission case to cover said opening, said cover member is shaped to include a concavity facing toward the transmission case forming therein a space,
a holder member formed separately from said cover member and fixed on an under surface of said cover member to be at least partially contained within said space and positioned at the inside of a contacting face of said cover member provided for coming into contact with an upper end face of said transmission case, and
a shift rod supported by said holder member to be movable in a direction along its axis at a position above the output shaft for causing the gear trains to be in operation to transmit the output selectively.

9. A gear type transmission apparatus according to claim 8, wherein said holder member is provided with a shift rod supporting portion disposed to be at least partially lower than the level of the contacting face of said cover member.

10. A gear type transmission apparatus comprising, a transmission case containing a gear train arrangement including a plurality of gear trains and an output shaft to which an output of an engine is transmitted through the gear train arrangement and provided with an opening at an upper portion thereof, a cover member mounted on the upper portion of said transmission case to cover said opening, a holder member formed separately from said cover member and fixed on an under surface of said cover member to be positioned at the inside of a contacting face of said cover member provided for coming into contact with an upper end face of said transmission case, wherein said cover member is provided with the under surface on which said holder member is fixed at substantially the same level as said contacting face, and said holder member is provided with a shift rod supporting portion disposed to be at least partially lower than the level of the contacting face of said cover member, and a shift rod supported by said shift rod supporting portion of said holder member to be movable in a direction along its axis at a position above the output shaft for causing the gear trains to be in operation to transmit the output selectively and at least part of said shift rod is positioned to be higher than said contacting face.

11. A gear type transmission apparatus comprising, a transmission case containing a gear train arrangement including a plurality of gear trains and an output shaft to which an output of an engine is transmitted through the gear train arrangement and provided with an opening at an upper portion thereof, a cover member mounted on the upper portion of said transmission case to cover said opening, a holder member formed separately from said cover member and fixed on an under surface of said cover member to be positioned at the inside of a contacting face of said cover member provided for coming into contact with an upper end face of said transmission case, a shift rod supported by said holder member to be movable in a direction along its axis at a position above the output shaft for causing the gear trains to be in operation to transmit the output selectively, and two additional shift rods also supported by said holder member so that an arrangement of three parallel shift rods is made, a control rod provided behind said three parallel shift rods to be rotated around an axis thereof and shifted in a direction along the axis thereof, and a gate mechanism for connecting said control rod with each of said three parallel shift rods selectively, said gate mechanism comprising three connecting members fixed on rear end portions of said three parallel shift rods respectively and provided with respective cutouts made to be adjacent to one another and an engaging projection fixed on a front end portion of said control rod for engaging with each of the cutouts selectively when said control rod is rotated, and the connecting member fixed on one of said three parallel shift rods located at the middle being provided with a pair of block portions arranged in a direction along each of said three parallel shift rods to face each other with the cutout between and a linking portion disposed to overlap with another connecting member provided on one of said three parallel shift rods located at the side for interconnecting therethrough the block portions.

* * * * *